United States Patent [19]

Brookshire et al.

[11] Patent Number: 5,687,637
[45] Date of Patent: Nov. 18, 1997

[54] AUTOMATIC TEA BREWING DEVICE

[75] Inventors: Phillip L. Brookshire, Cincinnati, Ohio; Robert A. Demars, Woodland Hills, Calif.; David Dinunzio, Mentor, Ohio; Spencer L. Mackay, Agoura Hills, Calif.; Joseph F. Moore, Richmond, Va.; Craig Weidman, Wooster, Ohio

[73] Assignee: Healthometer, Inc., Bedford Hts., Ohio

[21] Appl. No.: 431,082

[22] Filed: Apr. 28, 1995

[51] Int. Cl.[6] .................................. A47J 37/00
[52] U.S. Cl. .................... 99/295; 99/300; 99/302 R; 99/306; 99/316
[58] Field of Search .................... 99/279, 285, 286, 99/295, 299, 300, 302 R, 304, 306, 307, 316

[56] References Cited

U.S. PATENT DOCUMENTS

| | | |
|---|---|---|
| 1,965,750 | 7/1934 | Richheimer . |
| 3,902,408 | 9/1975 | Fuhner . |
| 4,467,707 | 8/1984 | Amiot ................... 99/295 |
| 4,676,148 | 6/1987 | Foley ................... 99/295 |
| 4,790,240 | 12/1988 | Henn et al. . |
| 4,843,954 | 7/1989 | Henn . |
| 4,843,955 | 7/1989 | Henn et al. . |
| 4,888,465 | 12/1989 | Hoffmann . |
| 4,888,466 | 12/1989 | Hoffmann . |
| 4,888,467 | 12/1989 | Hoffmann . |
| 4,889,041 | 12/1989 | Mahlich et al. . |
| 4,920,868 | 5/1990 | Gehrmann . |
| 4,922,809 | 5/1990 | Fuhner . |
| 4,969,393 | 11/1990 | Chr. Mahlick et al. . |
| 4,977,819 | 12/1990 | Lorenz . |
| 4,998,463 | 3/1991 | Precht et al. . |
| 5,063,838 | 11/1991 | Matuschek . |
| 5,081,915 | 1/1992 | Beumer . |
| 5,251,541 | 10/1993 | Anson et al. . |

*Primary Examiner*—Reginald Alexander
*Attorney, Agent, or Firm*—Calfee, Halter & Griswold LLP

[57] ABSTRACT

A device for automatically brewing and holding tea has a water reservoir and a combined water reservoir inlet and heated water distributor attached to and extending forward from the water reservoir, a base for holding a hot tea receptacle under the combined water reservoir inlet and heated water distributor. A hot tea receptacle especially adapted for use with the device has a flat bottom surface for optimal heat transfer from the base to the receptacle.

27 Claims, 9 Drawing Sheets

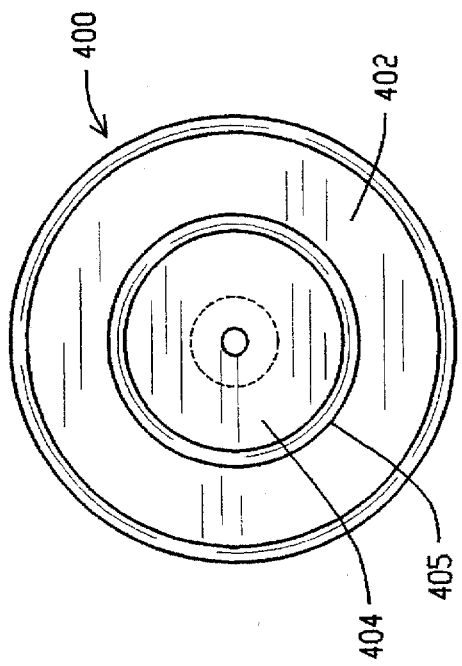
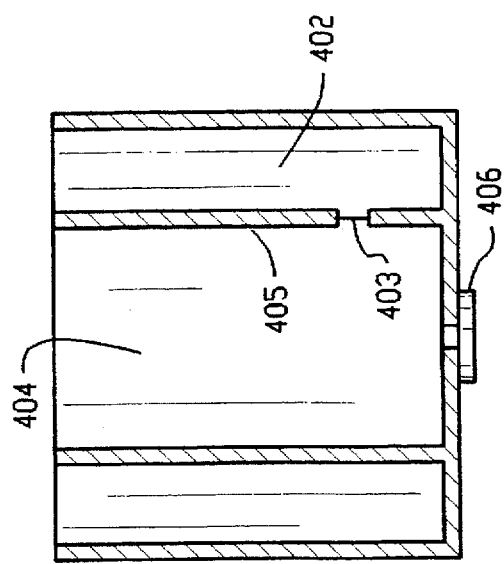
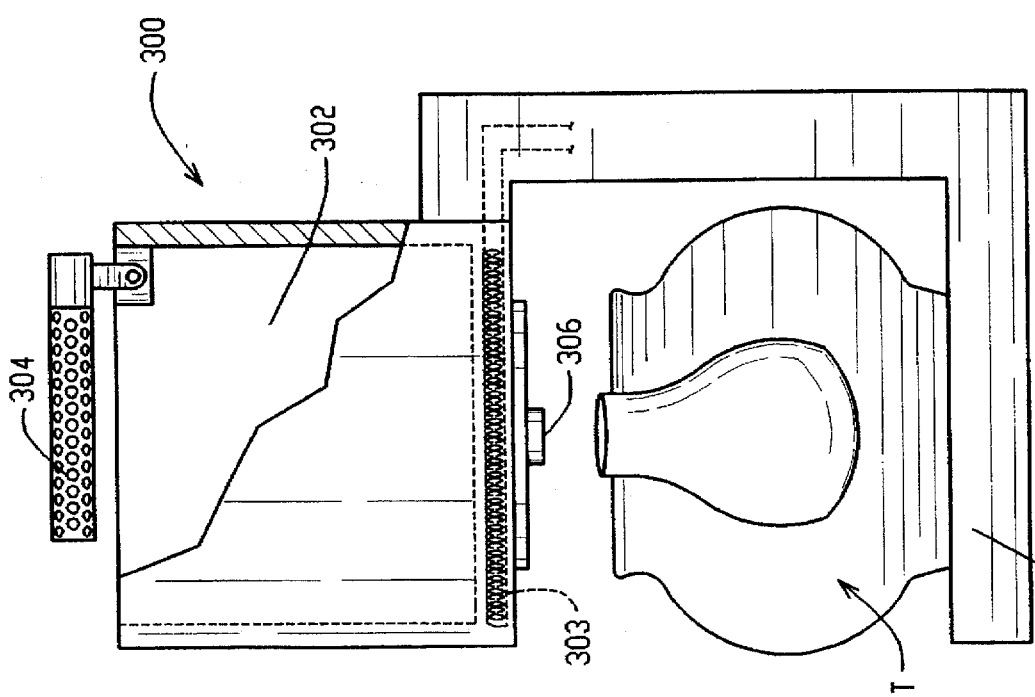

AUTOMATIC TEA BREWING DEVICE

FIELD OF THE INVENTION

The present invention pertains in general to automatic brewing devices and, in particular, to automatic brewing devices for brewing tea.

BACKGROUND OF THE INVENTION

Brewed tea is traditionally prepared by first boiling water and then transferring the boiling water to a pot holding tea leaves in a tea ball or bag. The tea is allowed to steep whereupon flavor is extracted from the tea leaves into the water. The strength of the flavor of the tea is primarily dependent upon the length of the steeping period.

Automatic brewing devices which heat water and transfer the heated water to a brewing basket or chamber for contact with a brewing material have heretofore been principally employed for brewing coffee and coffee related drinks such as cappucino. Such devices can be used with some success for preparing hot tea. See for example U.S. Pat. Nos. 4,790,240 and 4,843,954. However, since coffee-derived beverages typically do not require a steeping process wherein heated water is held in prolonged contact with ground coffee beans, these devices simply drain the brewing water from a brewing devices which do not provide precise control of the rate of flow of heated water through a steeping chamber in which tea leaves are held are not ideally suited for brewing tea.

Automatic coffee makers typically utilize relatively thin-walled glass receptacles or decanters to receive, hold and thermally insulate the brewed coffee. Though suitable for coffee, these types of decanters are inadequate as receptacles for hot brewed tea for the reasons that they do not provide maximum insulation for heat retention including the absence of an insulative lid or cover, and are not aesthetically appropriate for typical tea drinkers accustom to serving hot tea from a traditional tea pot.

The present invention overcomes these and other disadvantages of the apparatus and methods of the prior art used to automatically prepare hot tea.

SUMMARY OF THE PRESENT INVENTION

The present invention provides entirely new and novel apparatus and method for the preparation, including steeping and retention, of hot tea which overcomes the inadequacies of all prior apparatus and methods.

In accordance with one aspect of the invention, an apparatus for brewing and holding hot tea includes a water reservoir, a water reservoir filling inlet positioned forward of the water reservoir, a heating element connected to the water reservoir for heating water from the reservoir, heated water transfer means for transferring heated water from the reservoir into a steeping chamber, the steeping chamber including a cavity for receiving and holding heated water and tea and a controlled valve for releasing brewed tea from the steeping chamber at the end of a controlled steeping period into an insulative tea pot receptacle having an integrally molded handle.

In accordance with another aspect of the invention, an apparatus for automatically brewing hot tea includes a water reservoir, a combined heating and pumping element in contact with the water reservoir for heating water from the water reservoir and pumping the heated water into a brewing chamber, the brewing chamber having a cavity for receiving tea and heated water and an opening through which brewed tea is released from the brewing chamber into an insulated tea pot having a handle integrally molded with a main vessel portion of the tea pot.

In accordance with still another aspect of the invention, a device for automatically brewing tea and maintaining brewed tea in a heated condition includes, in combination, a housing including a tea pot base, a water reservoir, a heating element positioned in the tea pot base and connected to the water reservoir, a combined heated water distributor and water fill inlet extending forward from the water reservoir and positioned over the tea pot base.

BRIEF DESCRIPTION OF THE FIGURES

In the annexed Figures:

FIG. 10 is a schematic view of an alternate embodiment of the automatic tea brewing device of the present invention, and FIGS. 11A–11B are schematic views of an alternate embodiment of a combined heating/steeping chamber which may be incorporated in the automatic tea brewing device of the present invention.

DETAILED DESCRIPTION OF PREFERRED EMBODIMENTS

Figure 1A:
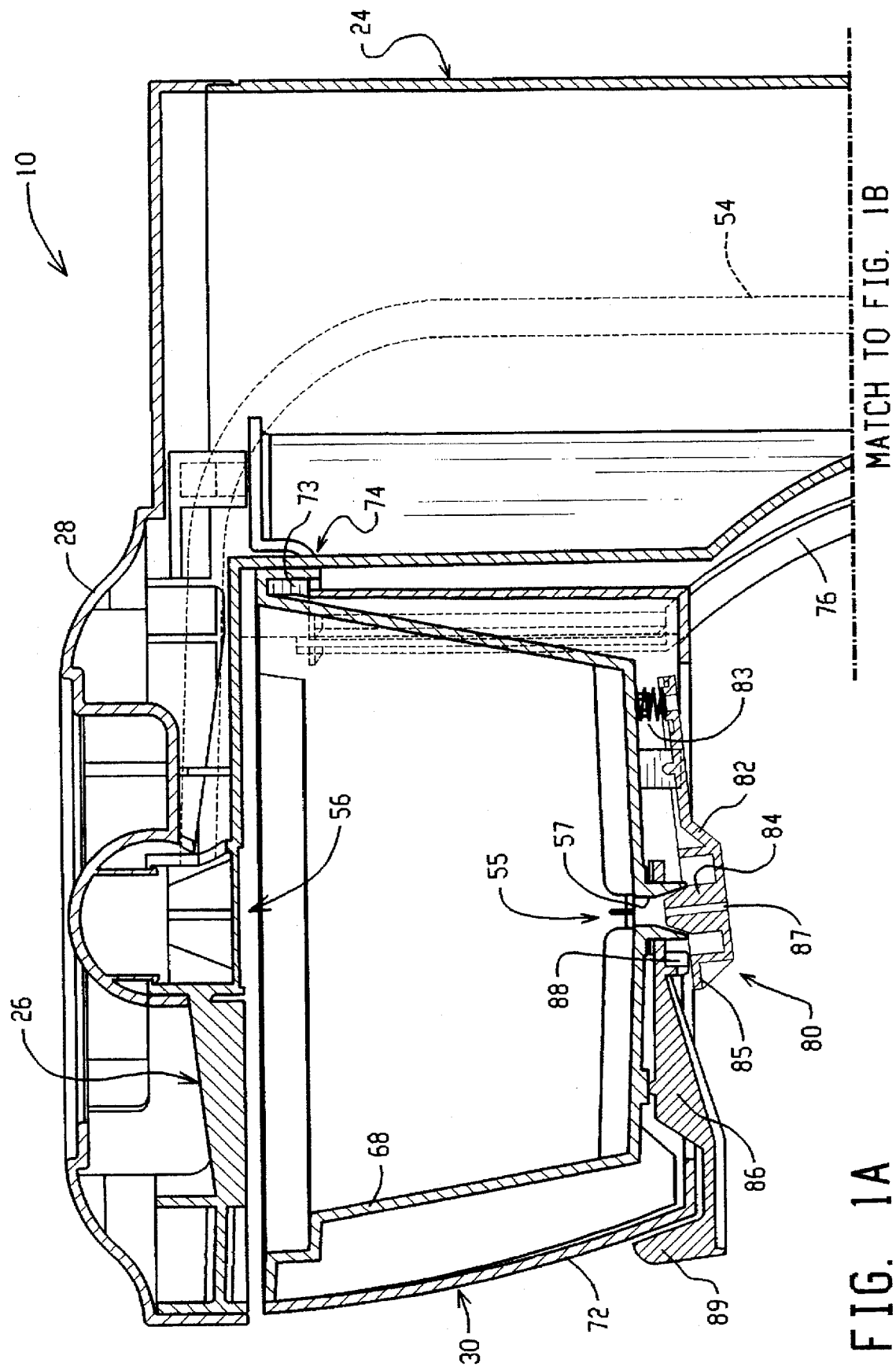
FIGS. 1A and 1B is a cross-sectional side elevation of the automatic tea brewing device of the present invention.
Figure 1B:
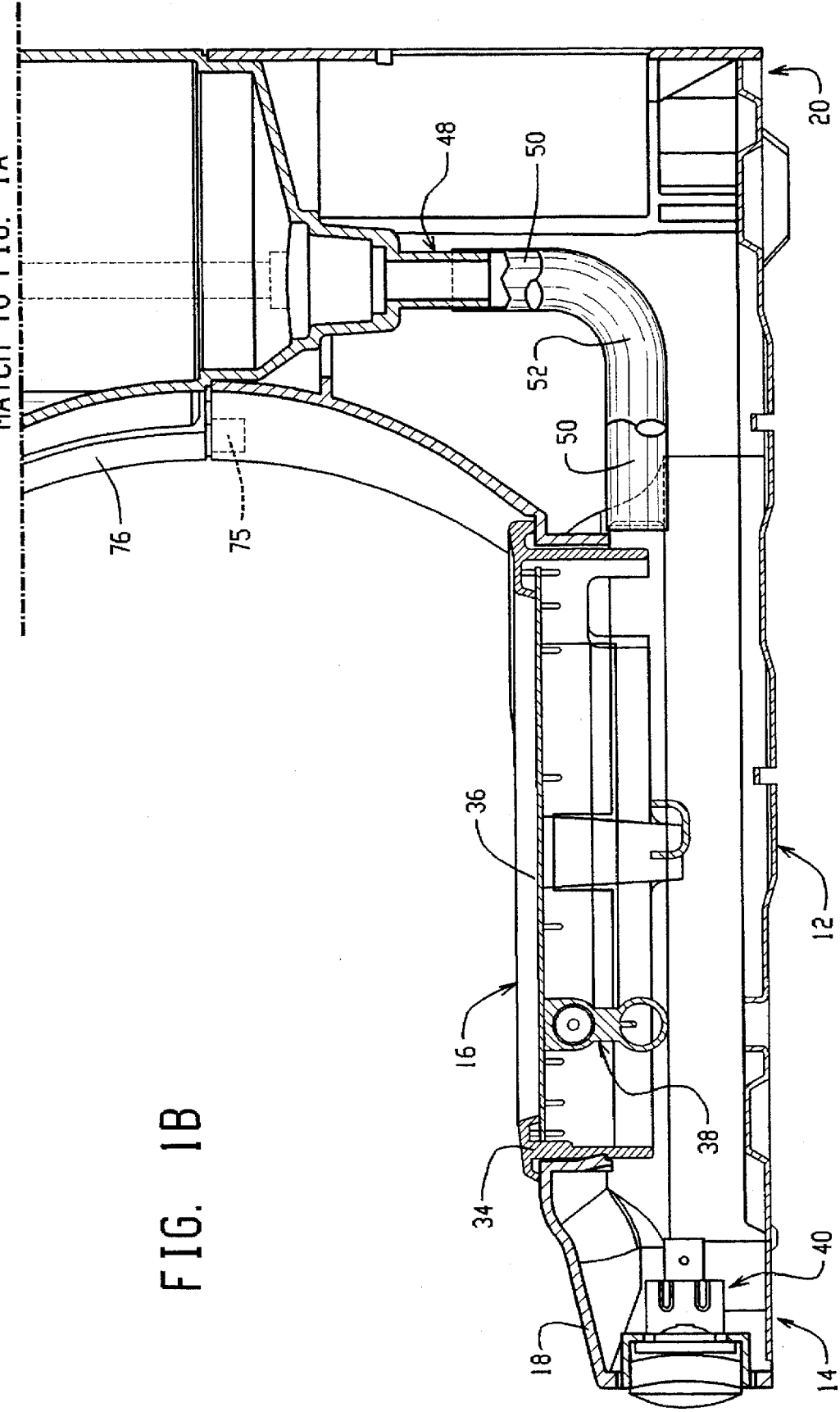

With initial reference to FIGS. 1A and 1B, there is illustrated an automatic tea brewing device, indicated generally at 10, which is particularly adapted and especially suited for brewing and holding hot tea. The device includes the basic components of a base 12 which has a forward section 14 which includes a heated tea pot warming platform 16 and a housing 18 for a heating element described below, and a rearward section 20; a water reservoir 24 which fits upon and is supported by the rearward section 20 of base 12; a combined water reservoir inlet and heated water distributor structure 26 (also referred to herein simply as the water reservoir inlet 26) which extends forward of the water reservoir 24 and over the tea pot platform 16, a cover 28 which covers both the combined water reservoir inlet and the water reservoir 24, and a brewing or steeping chamber, indicated generally at 30, supported by a frontal wall of the water reservoir 24. Each of the aforementioned components are described in further detail below.

Figure 6:
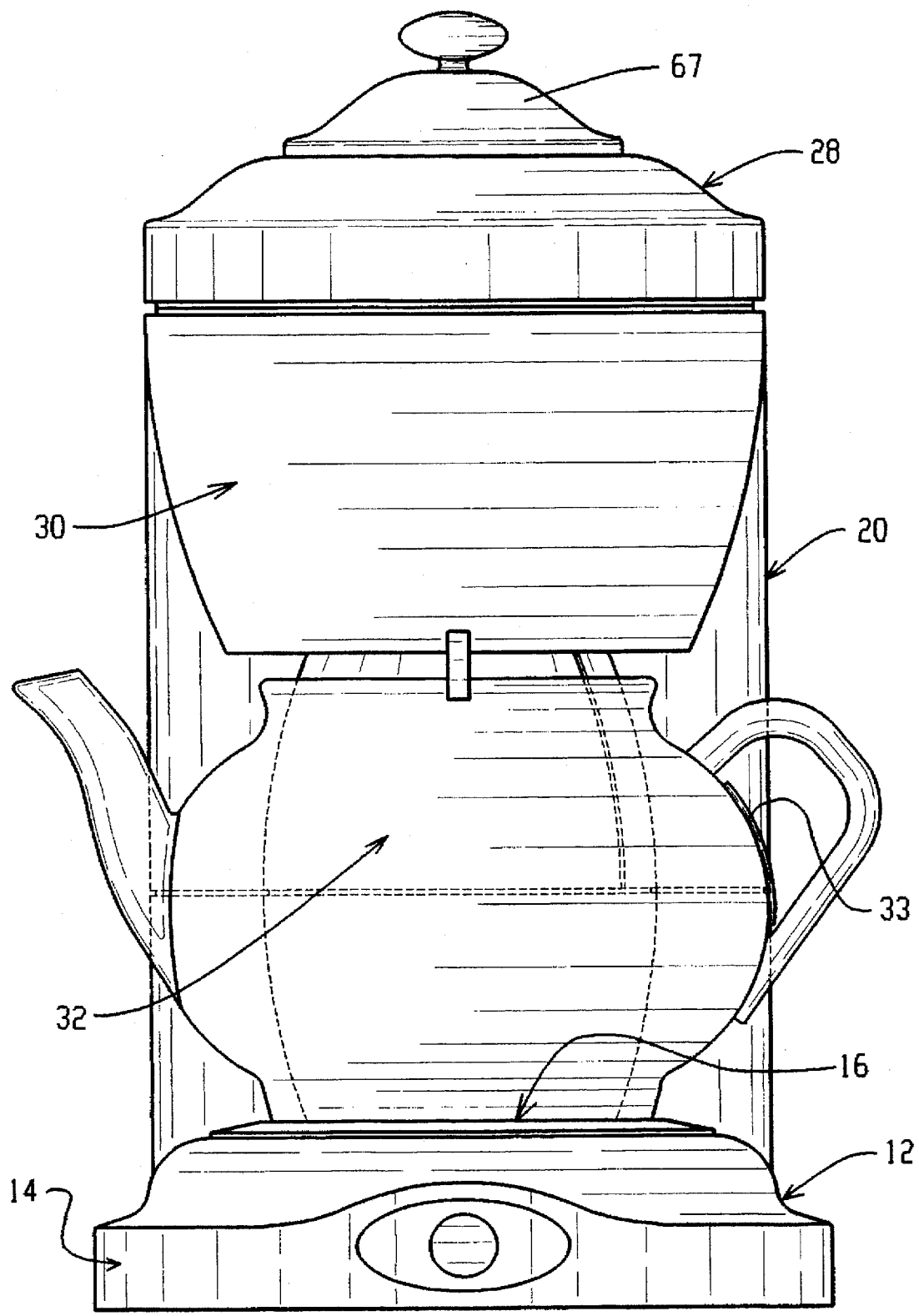
FIG. 6 is a front elevation of the automatic tea brewing device of the present invention.
Figure 7:
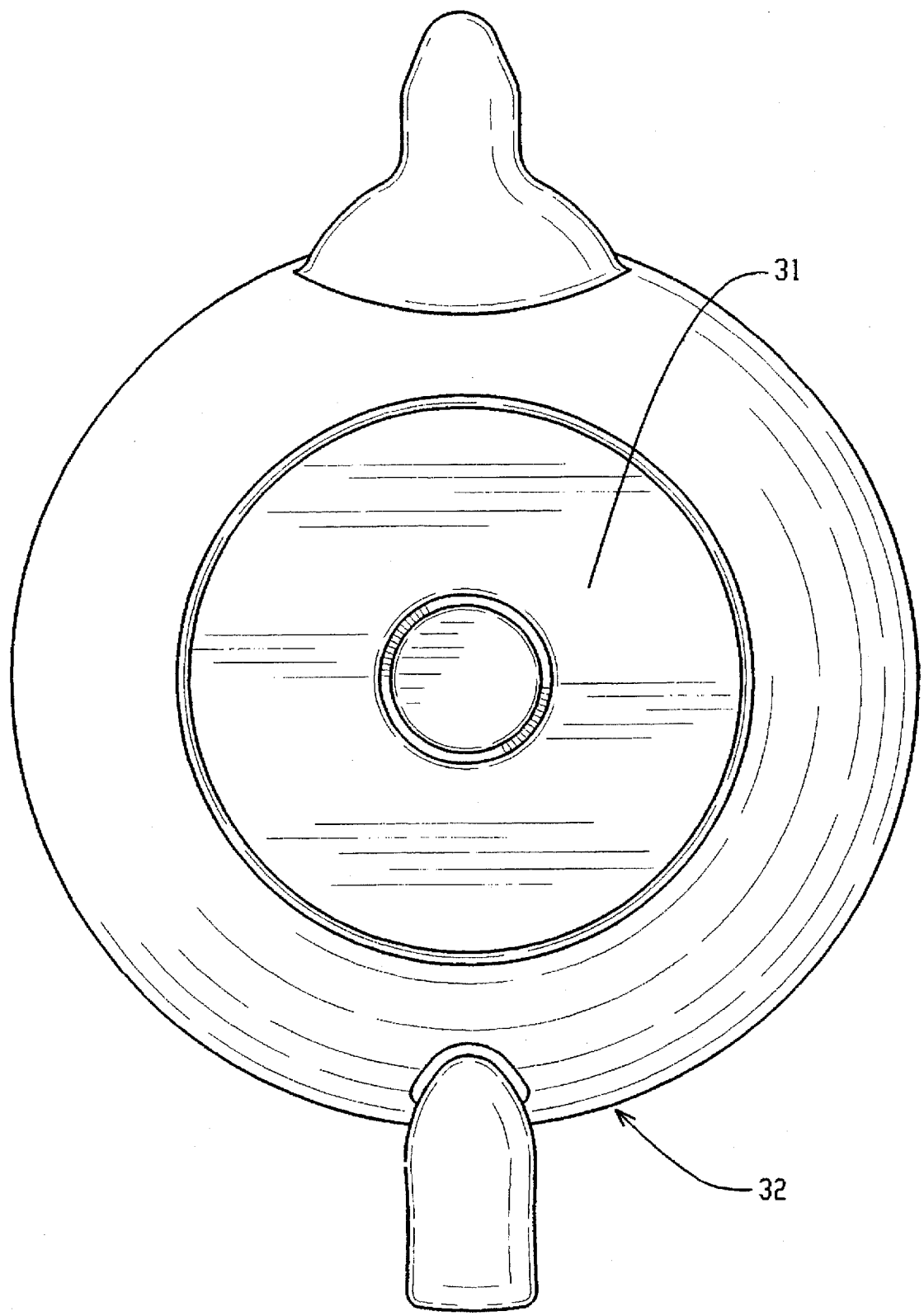
FIG. 7 is a bottom view of the tea pot of the automatic tea brewing device of the present invention.

Used in combination with the device 10 is a specially adapted tea pot 32 as shown in FIG. 6. The tea pot 32 is particularly suited and dimensioned to fit upon the tea pot platform 16 and within the area defined by the frontal wall of the water reservoir and the underside of the steeping chamber 30. An insulating pad 33 is applied to the area of the exterior surface of the vessel portion of the tea pot underneath the handle to prevent transfer of heat from the tea pot vessel to a hand gripping the handle. As shown in FIG. 7, the bottom of the tea pot is provided with a substantially flat surface area 31 which rests directly upon heating platform 16 to optimize heat transfer from the warming platform 16. As shown in FIG. 7, a selected portion of the total surface area of the tea pot bottom may be formed flat subject to, for example, the heat transfer characteristics of the tea pot material.

As further illustrated in FIGS. 1A and 1B, the tea pot warming platform 16 is incorporated into forward section 14 of base 12 by placement of a ring 34 within an opening in the base and encompasses a plate 36. Ring 34 may be made of a phenolic material and plate 36 of a metallic material such as aluminum. A water heating and warming element 38, operative to heat water drawn or drained from the water reservoir and pump the water by thermal expansion from a water conduit of the heating element to a heated water distributor as generally known in art and described for example in U.S. Pat. Nos. 4,613,745 and 5,183,998 incorporated herein by reference, is positioned underneath and in contact with plate 36 to perform the water heating function and provide a heat source to tea pot 32. The forward section 14 of base 12 also houses a switch, indicated generally at 40, electrically connected to the circuit elements schematically depicted in FIG. 3 also housed within base 12 proximate to heating and warming element 38.

Figure 2:
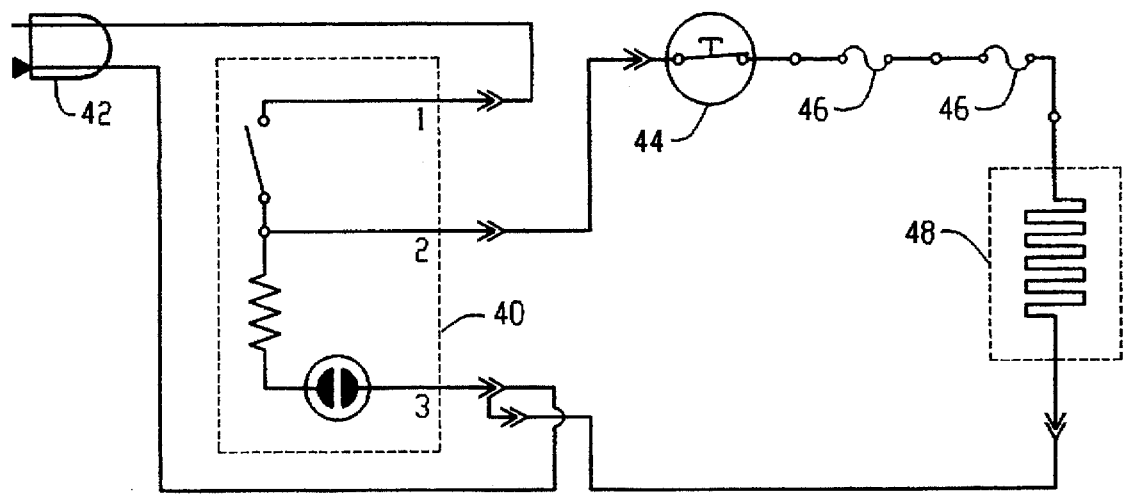
FIG. 2 is a schematic diagram of the electrical heating control circuit of the automatic tea brewing device of the present invention.

As schematically illustrated in FIG. 2, switch 40 is connected to a plug 42 and in series to a thermostat 44, thermal fuses 46 and heater resistive element 48 of heating and warming element 38. With the switch in the closed "on" position, indicator light 43 is illuminated and the heater element is energized to a maximum heating temperature regulated by thermostat 44 and limited by fuses 46.

Referring again to FIGS. 1A and 1B, a bottom portion of water reservoir 24 includes an integrally formed stepped funnel 48 adapted to receive a pressure-controlled unidirectional plunger type check valve known in the art for allowing water to drain from the reservoir to the heating element and preventing water from reentering the reservoir. A water supply tube 50 connects funnel 48 to an input end of heating and warming element 38. A heated water supply tube 52 connects an output end of heating and warming element 38 to a riser tube 54 generally vertically disposed within water reservoir 24 and bent at an upper end to lie flat within the water reservoir inlet 26 and terminated at a heated water distributor hole 56 formed centrally in the underside of the combined water reservoir inlet and heated water distributor structure 26 and over the steeping chamber 30. A flow path from the water reservoir, through the heating element, and to the steeping chamber is thus provided.

Figure 3:
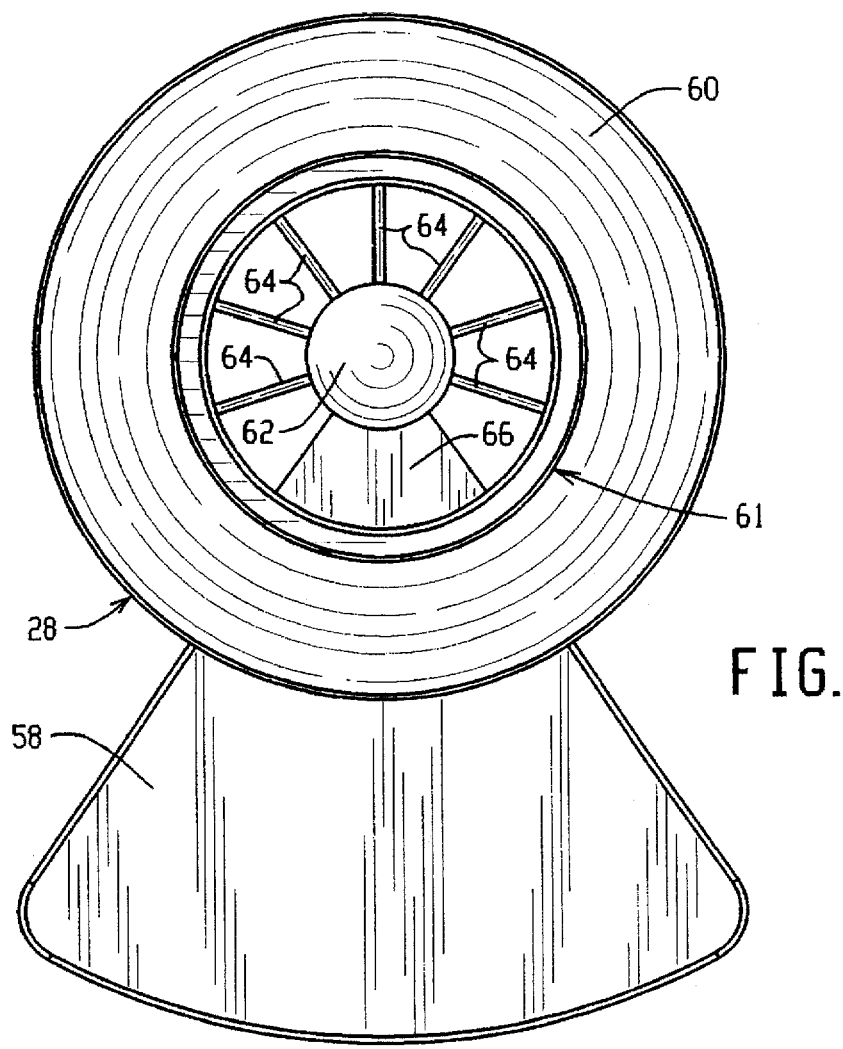
FIG. 3 is a top view of the cover of the automatic tea brewing device of the present invention.

With additional reference to FIG. 3, cover 28 includes a solid rearward section 58 which covers the top opening of the water reservoir, and a forward water inlet section 60 which fits over the forward end of the combined water reservoir inlet and heated water distributor structure 26. The water inlet section 60 of cover 28 is uniquely constructed and contoured to cover the heated water distributor hole 56 and to provide a splash-free water disbursement structure. The generally circular opening 61 includes a dome 62 (positioned directly over the heated water distributor hole 56) and multiple fins 64 which extend radially from the dome. A solid section 66 which extends rearward from the dome covers the horizontally positioned segment of the heated water supply tube 52. Water poured into the forward positioned water inlet section 60 of cover 28 is evenly distributed onto the water reservoir inlet 26, which is internally sloped into water reservoir 24. The positioning of the combined water reservoir inlet and heated water distributor structure 26 forward of the reservoir allows the reservoir to be conveniently filled without having to reach to the back of the device. Circular opening 61 is dimensioned to be covered by lid 67 of tea pot 32 as shown in FIG. 6.

Figure 4A:
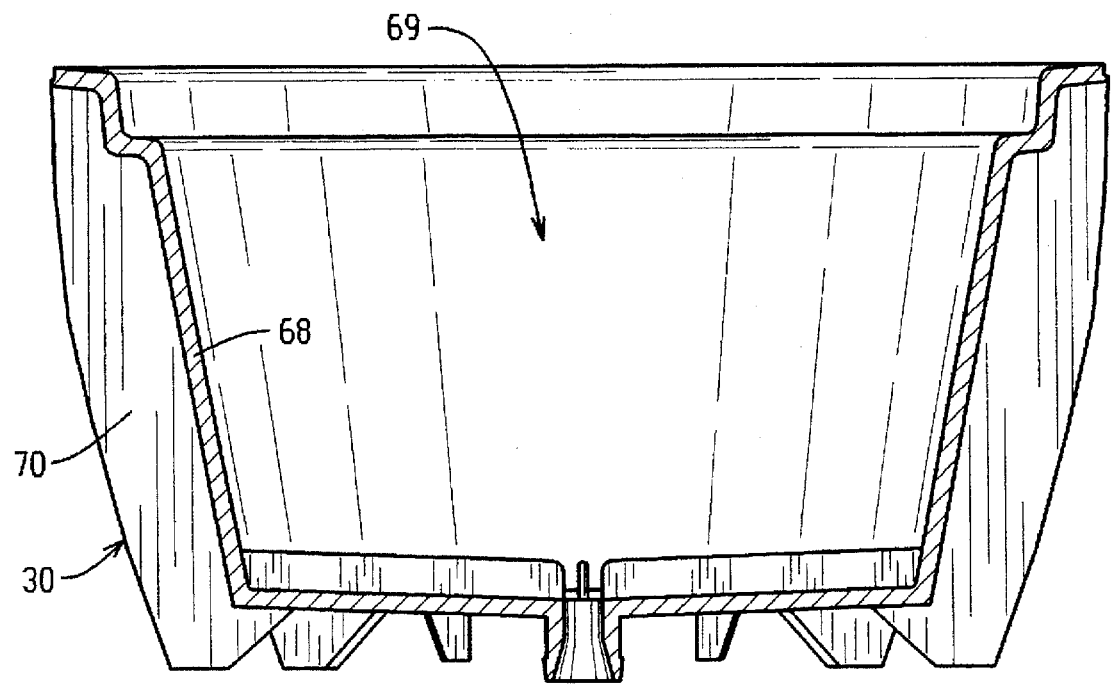
FIG. 4A is a cross-sectional side elevation of the inner component of the steeping chamber of the automatic tea brewing device of the present invention.
Figure 4B:
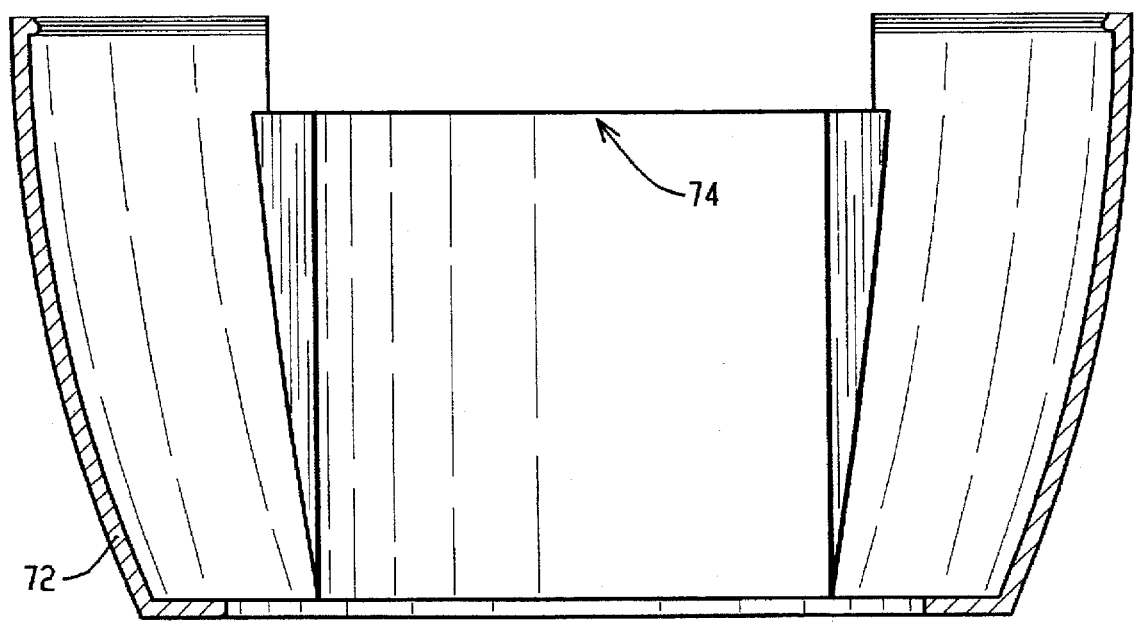
FIG. 4B is a partial cross-sectional side elevation of the outer component of the steeping chamber of the automatic tea brewing device of the present invention.

Referring to FIG. 1A and 1B and FIGS. 4A and 4B, the steeping chamber 30 is formed of an inner section 68 (FIG. 4A) which fits within an outer section 72 (FIG. 4B). Inner section 68 includes a cavity 69 for receiving tea in a bag, filter or tea ball and a quantity of heated water for steeping and a brewed tea exit port 57 in the center of the bottom wall. The cavity 69 of the inner section is dimensioned to optimize the water line or steeping head of the heated water introduced from the water distributor and with tea in the steeping chamber. The exterior of inner section 68 is provided with radially extending fins 70 contoured to abut the interior surface of an outer section 72 to form a double insulative wall of the steeping chamber.

As shown in FIGS. 1A and 1B, a stepped groove 74 in a posterior segment of the outer section 72 is provided to engage a flange 73 of a steeping chamber support arm 76 vertically hinge-mounted and recessed within the frontal wall of the reservoir. The support arm 76 is removable from the structure by vertical displacement of upper and lower hinge pins 75 and 77 to disengage lower hinge pin 77 from a lower hinge pin seat formed in the rearward section 20 of base 12.

Figure 5A:
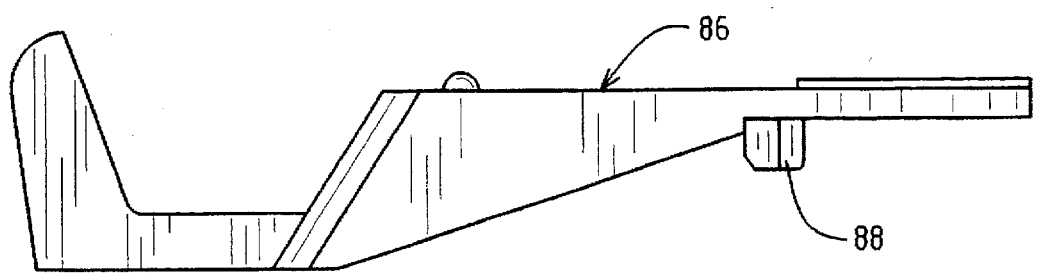
FIGS. 5A–5C are side, top and end views, respectively, of the control arm of the flow control valve of the automatic tea brewing device of the present invention.
Figure 5B:
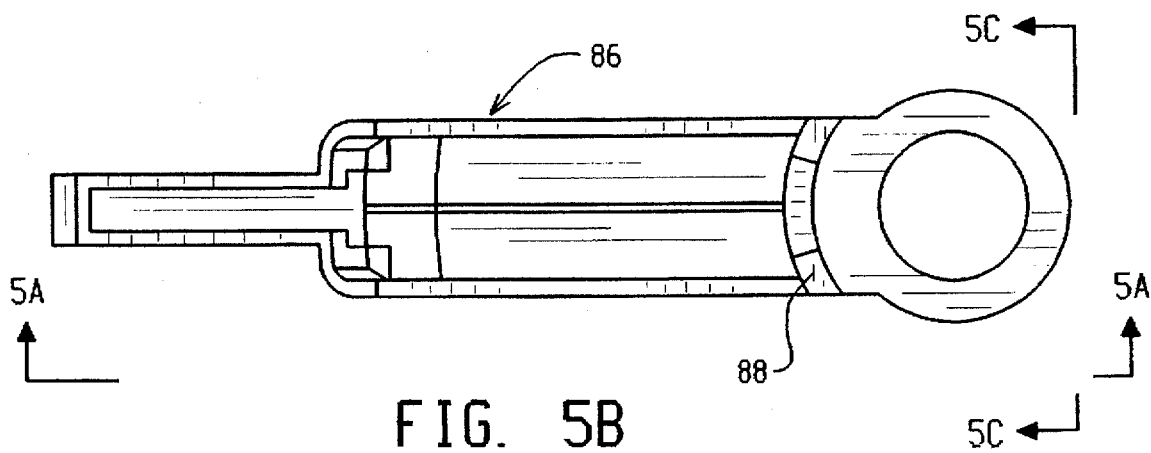
Figure 5C:
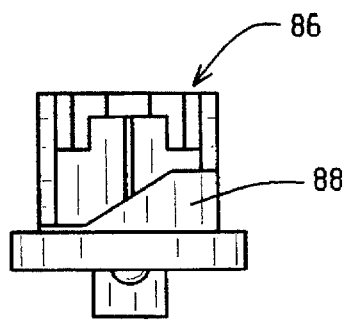

The rate of flow of heated water through the steeping chamber 30 is regulated by a novel flow control valve pivotally secured to the bottom of the inner section 68. The valve, indicated generally at 80 in FIGS. 1A and 1B, includes a valve arm 82 with a frusto-conical valve plunger 84 positioned and biased by a spring 83 for partial adjustable insertion into the brewed tea exit port 57 which has a complementary frusto-conical shape. A toggle control arm 86, pivotally secured about the neck of exit port 57 includes a vertical displacement ramp 88 (shown in isolated detail in FIGS. 5A–5C) in contact with a distal tab 85 of valve arm 82, whereby radial adjustment of arm 86 changes the relative position of distal tab 85 of valve arm 82 upon displacement ramp 88 to thereby adjust the relative position of valve plunger 84 within exit port 57 and the consequent flow rate therethrough. A small through-hole 87 (e.g., 0.003" diameter) may be provided in valve plunger 84 for fine adjustment of the flow rate and elevation of the steeping head. A finger tab 89 on the forward distal end of control arm 86 allows the valve to be easily adjusted from the front of the steeping chamber.

Figure 8:
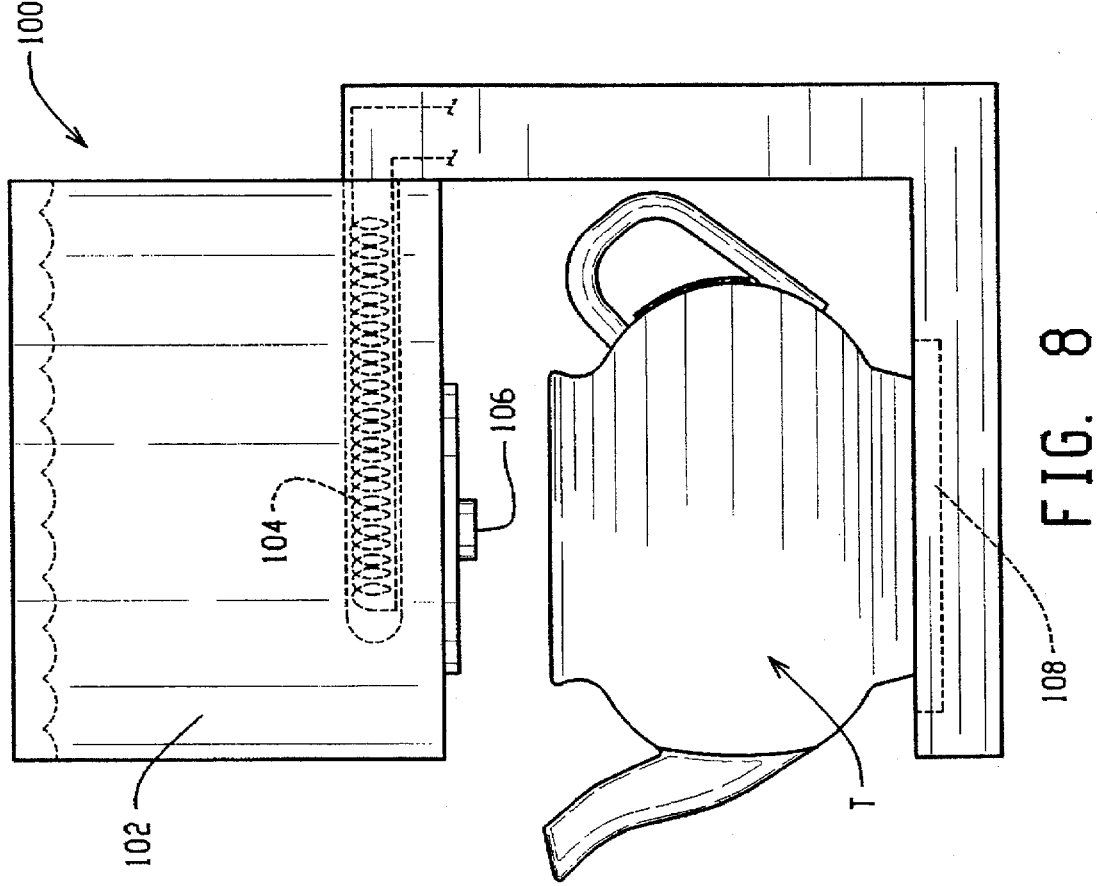
FIG. 8 is a schematic view of an alternate embodiment of the automatic tea brewing device of the present invention.

The invention further includes certain alternate embodiments novelly configured to automatically brew hot tea. For example, FIG. 8 schematically illustrates an automatic tea brewing device 100 which has a single water heating and steeping chamber 102 in which water is boiled by a heating element 104 disposed within or secured in contact with chamber 102 which may be metallic. An alarm or bell may be provided to go off when the water is sufficiently heated for sleeping so that the user knows to insert the tea bags in the chamber 102 or, alternatively, in the tea pot T. Of course, tea bags may be pre-placed in cold water before the device is activated. When the tea is to be steeped in the chamber 102, a timer-controlled valve member 106 at a bottom exit point of the chamber is set to open at the end of a pre-set heating/steeping period, such as 3 to 5 minutes, whereupon hot water or tea is drained directly from the chamber into a tea pot T positioned underneath the chamber upon a heated pad 108. Alternatively, when the tea is to be steeped in the tea pot T, the valve is set to open when the water reaches the correct steeping temperature.

Figure 9:
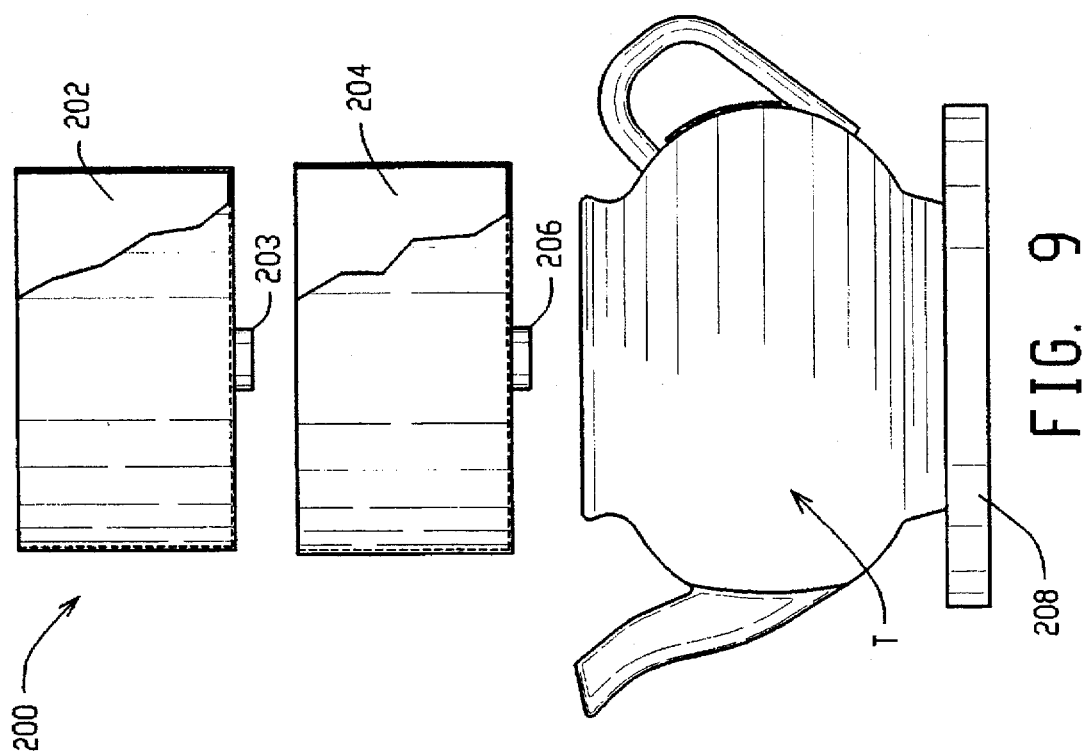
FIG. 9 is a schematic view of an alternate embodiment of the automatic tea brewing device of the present invention.

FIG. 9 schematically illustrates another automatic tea brewing device 200 of the invention wherein a water heating chamber 202 is disposed vertically over a separate steeping chamber 204. Brewing water is heated in chamber 202, by for example an electric heating element in the walls of chamber 202, to a steeping temperature whereupon it is released by a time or temperature controlled valve 203 into the steeping chamber 204. The water is held in steeping chamber 204 for a predetermined period of time by timed control of a tea-release valve 206 which releases brewed tea from chamber 204 into a tea pot T on a heated base 208 directly beneath the sleeping chamber.

FIG. 10 schematically illustrates still another embodiment 300 of the automatic tea brewing device of the present invention wherein a single heating/steeping chamber 302 is again positioned directly over a tea pot T upon a heated base 301. Water is heated within chamber 302, by for example an electric heating element 303. When the water reaches the correct temperature for brewing tea, an infuser 304 containing tea leaves or tea bags is at least partially submerged into the water in chamber 302. The infuser 304 can be either manually submerged, or automatically submerged by for example a solenoid, or a thermo-mechanical device such as a piston actuator in contact with the sleeping water and a lever arm of the infuser. A time controlled valve 306 releases the brewed tea from the chamber after a pre-determined steeping period directly into tea pot T.

FIGS. 11A–11B schematically illustrate an alternate embodiment of a combined heating/steeping chamber 400 for incorporation in an automatic tea brewing device of the present invention. As shown in FIG. 11A, the chamber 400 has a water heating reservoir 402 wherein the steeping water is heated, by for example electrical resistance elements. The reservoir 402 is disposed peripherally about an inner steeping chamber 404 wherein tea in a bag or ball or filter is suspended or otherwise held. As shown in FIG. 11B, one or more valves 403 in the wall 405 separating the reservoir 402 and the steeping chamber 404 control the release of heated water from the reservoir into the steeping chamber. For example, valve 403 may be a thermally responsive bi-metal valve operative to open at a pre-determined steeping temperature. A timer-controlled drainage valve 406 is provided at the bottom of the steeping chamber 404 to release brewed tea into tea pot T at the end of a steeping period.

Although the invention has been described with respect to certain preferred and alternate embodiments, modifications and variations which may occur to those of skill in the art are equivalent to and within the scope of the invention as defined by the accompanying claims.

What is claimed is:

1. A device for brewing hot tea comprising:
    a water reservoir,
    a combined water reservoir inlet and heated water distributor structure connected to and extending forward of the water reservoir,
    a steeping chamber attached to the water reservoir and positioned under the combined water inlet and heated water distributor structure, and
    a base for a brewed tea receptacle, the base positioned forward of the water reservoir and under the steeping chamber.

2. The device of the claim 1 further comprising a heating element connected to a fluid passageway connected to the water reservoir for receiving and heating water from the water reservoir and pumping the water into the combined water filling and distributor structure.

3. The device of claim 1 wherein the steeping chamber is comprised of an inner section and an outer section, and a controllable valve in a bottom opening of the steeping chamber for releasing brewed tea into a receptacle positioned on the base, the controllable valve being attached to the inner section of the steeping chamber.

4. The device of claim 1 wherein the base for the brewed tea receptacle comprises a substantially flat heated surface.

5. The device of claim 3 wherein the controllable valve comprises mating conical surfaces.

6. The device of claim 5 wherein a separation distance of the mating conical surfaces of the valve is adjusted by a control arm of the valve.

7. The device of claim 1 further comprising a water diverter in an opening of the combined water reservoir inlet and heated water distributor structure, the water diverter comprising a generally dome-shaped structure in a central area of a water filling opening and a plurality of fins extending radially outward from the dome structure across the opening.

8. The device of claim 5 further comprising a cover for the opening in the water inlet, the cover dimensioned to also cover an opening in the receptacle.

9. An automatic tea brewing device comprising:
    a water reservoir;
    a combined water reservoir inlet and heated water distributor structure attached to the water reservoir, the structure including a water reservoir inlet hole and a heated water distributor hole positioned forward of the water reservoir, and
    a base for receiving a brewed tea receptacle, the base attached to the water reservoir and positioned under the combined water reservoir inlet and heated water distributor structure.

10. The automatic tea brewing device of claim 9 further comprising a brewed tea receptacle in the form of a traditional tea pot having a generally bulbous body, a top opening, a spout extending from a side of the body and having a pouring outlet not connected to the top opening, a handle integrally formed with the body, and a removable cover dimensioned to cover the top opening.

11. The automatic tea brewing device of claim 10 wherein the brewed tea receptacle further comprises an insulating pad attached to the body at an area proximate to the handle.

12. The automatic tea brewing device of claim 10 wherein the brewed tea receptacle has a substantially flat bottom.

13. The automatic tea brewing device of claim 12 wherein the substantially flat bottom of the brewed tea receptacle is formed by a flat surface which extends radially inward from a bottom edge of the bulbous body toward the center of the bottom of the receptacle.

14. The automatic tea brewing device of claim 12 wherein the substantially flat bottom of the brewed tea receptacle rests substantially flush against the base of the automatic tea brewing device.

15. The automatic tea brewing device of claim 9 wherein the water inlet hole further comprises a dome and fin structure wherein a dome is positioned in a central area of the water reservoir inlet hole and fins extend radially from the dome to edges of the water reservoir inlet hole.

16. The automatic tea brewing device of claim 9 further comprising a steeping chamber attachable to the water reservoir and positionable underneath the combined water reservoir inlet and heated water distributor structure whereby heated water passed through the heated water distributor hole enters the steeping chamber.

17. The automatic tea brewing device of claim 16 wherein the steeping chamber is removably supported by a vertical hinge mounted steeping chamber support arm.

18. The automatic tea brewing device of claim 16 wherein the vertical hinge mounted steeping chamber support arm is removable from hinged engagement with the water reservoir.

19. The automatic tea brewing device of claim 16 wherein the steeping chamber is comprised of cooperating inner and outer sections wherein the outer section is spaced from the inner section.

20. The automatic tea brewing device of claim 16 wherein the steeping chamber further comprises an exit port through which brewed tea drains into the brewed tea receptacle, and a flow control valve attached to the exit port.

21. The automatic tea brewing device of claim 20 wherein the flow control valve of the steeping chamber comprises a valve arm and a cooperating valve control arm, the valve arm having a frusto-conical valve plunger positioned in the exit port, the valve control arm further comprising a displacement ramp in contact with a distaltab of the valve arm to adjust a relative position of the valve plunger within the steeping chamber exit port.

22. The automatic tea brewing device of claim 21 wherein the frusto-conical valve plunger of the valve arm further comprises a small through-hole.

23. The automatic tea brewing device of claim 21 wherein an end of the valve arm opposite the frusto-conical valve plunger is attached to a spring to bias the valve plunger into the exit port.

24. The automatic tea brewing device of claim 21 wherein an end of the valve arm which supports the frusto-conical valve plunger further comprises brewed tea drain holes arranged about the frusto-conical valve plunger.

25. The automatic tea brewing device of claim 21 wherein the valve arm further comprises a wall which surrounds the frusto-conical valve plunger.

26. The automatic tea brewing device of claim 23 wherein the valve arm is supported by hinged attachment to a bottom of the steeping chamber at a point between the frusto-conical valve plunger and the biasing spring.

27. The automatic tea brewing device of claim 9 wherein the combined water reservoir inlet and heated water distributor structure is comprised of a cover and a water reservoir inlet which extends forward of the water reservoir, wherein the cover securedly engages the water reservoir inlet.

* * * * *